United States Patent
Morrow et al.

(10) Patent No.: US 7,987,337 B1
(45) Date of Patent: *Jul. 26, 2011

(54) TRANSLATION LOOKASIDE BUFFER PREDICTION MECHANISM

(75) Inventors: Michael W. Morrow, Chandler, AZ (US); Dennis M. O'Connor, Chandler, AZ (US); Desikan Iyadurai, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 125 days.

This patent is subject to a terminal disclaimer.

(21) Appl. No.: 12/286,360

(22) Filed: Sep. 30, 2008

Related U.S. Application Data

(63) Continuation of application No. 11/528,791, filed on Sep. 27, 2006, now Pat. No. 7,434,027, which is a continuation of application No. 10/726,885, filed on Dec. 3, 2003, now Pat. No. 7,162,609.

(51) Int. Cl.
*G06F 12/00* (2006.01)
(52) U.S. Cl. .................................................. 711/207
(58) Field of Classification Search .................. None
See application file for complete search history.

(56) References Cited

U.S. PATENT DOCUMENTS

| | | | | |
|---|---|---|---|---|
| 5,335,333 A | * | 8/1994 | Hinton et al. | 711/207 |
| 5,392,410 A | * | 2/1995 | Liu | 711/3 |
| 5,893,930 A | | 4/1999 | Song | |
| 7,162,609 B2 | | 1/2007 | Morrow et al. | |
| 7,434,027 B2 | * | 10/2008 | Morrow et al. | 711/207 |

* cited by examiner

*Primary Examiner* — Hiep T Nguyen

(57) ABSTRACT

A memory management unit includes a translation lookaside buffer including a page table. The page table includes M entries where M is an integer greater than zero. A register interface selects one of the M entries. The translation lookaside buffer calculates an effective address based on the selected one of the M entries while at least one of mapping the selected one of the M entries to an index and selecting a set of the M entries based on a control signal.

20 Claims, 5 Drawing Sheets

TRANSLATION LOOKASIDE BUFFER PREDICTION MECHANISM

This application is a continuation of U.S. patent application Ser. No. 11/528,791, filed Sep. 27, 2006, which is a continuation of U.S. patent application Ser. No. 10/726,885, filed Dec. 3, 2003 (Now U.S. Pat. No. 7,162,609). The disclosures of the above applications are incorporated herein by reference in their entirety.

FIELD OF THE INVENTION

The present invention relates to computer systems; more particularly, the present invention relates to processors.

BACKGROUND

Contemporary computer systems implement virtual memory systems in order to create the illusion of a very large amount of memory that is exclusively available for each application run on a system. Typically, a specific amount of virtual memory is made available to each application, with each application being provided a separate space identifier that is used to separate memory associated with a particular application from others. The virtual memory is mapped to physical memory.

Mapping from a virtual address to a physical address is handled by a translation lookaside buffer (TLB). The TLB is a cache within a microprocessor that provides translations in the form of page table entries. The translations are typically generated using data structures in memory called "page tables", using an algorithm implemented in hardware or software. The results of executing this algorithm are stored in the TLB for future use. In conventional TLB pipelines, an effective address must be generated before the TLB can be indexed for a translation. However, having to wait for an address to be generated results in longer translation times.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
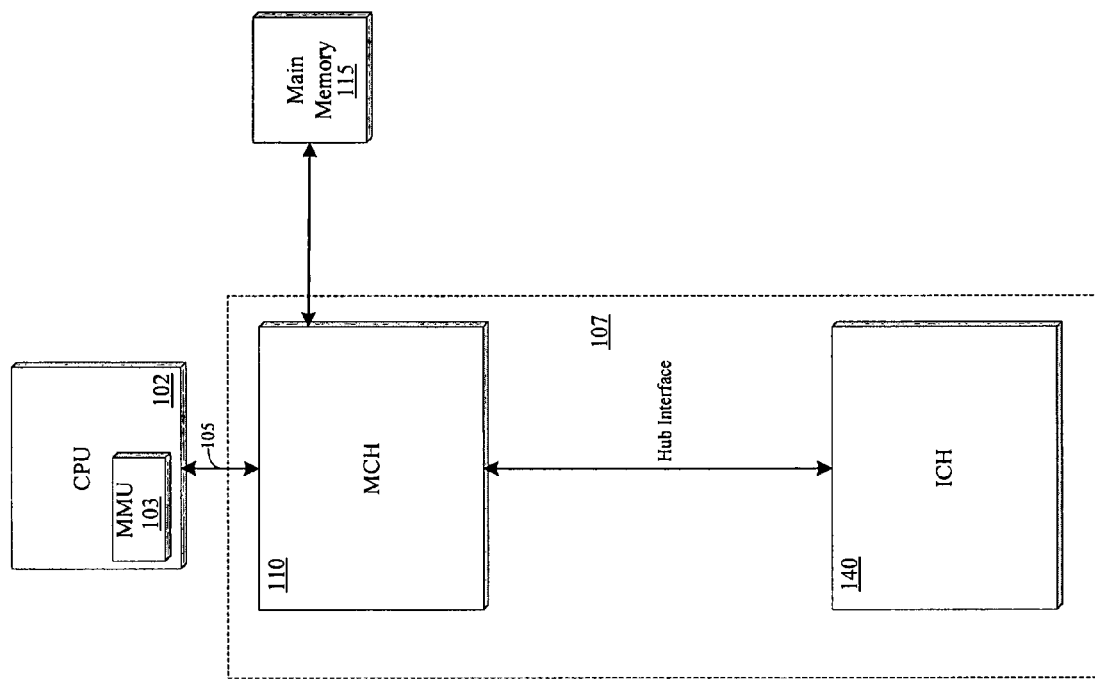
FIG. 1 illustrates one embodiment of a computer system.

A prediction mechanism for a translation lookaside buffer (TLB) is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), execution cores, etc.).

FIG. 1 is a block diagram of one embodiment of a computer system 100. Computer system 100 includes a central processing unit (CPU) 102 coupled to bus 105.

In one embodiment, CPU 102 is a processor in the Pentium® family of processors including the Pentium® II processor family, Pentium® III processors, and Pentium® IV processors available from Intel Corporation of Santa Clara, Calif. Alternatively, one of ordinary skill in the art will appreciate that other CPUs may be used.

A chipset 107 is also coupled to bus 105. Chipset 107 includes a memory control hub (MCH) 110. MCH 110 is coupled to a main system memory 115. Main system memory 115 stores data and sequences of instructions and code represented by data signals that may be executed by CPU 102 or any other device included in system 100.

In one embodiment, main system memory 115 includes dynamic random access memory (DRAM); however, main system memory 115 may be implemented using other memory types. Additional devices may also be coupled to bus 105, such as multiple CPUs and/or multiple system memories.

In one embodiment, MCH 110 is coupled to an input/output control hub (ICH) 140 via a hub interface. ICH 140 provides an interface to input/output (I/O) devices within computer system 100. For instance, ICH 140 may be coupled to a Peripheral Array Interconnect bus adhering to a Specification Revision 2.1 bus developed by the PCI Special Interest Group of Portland, Oreg. One of ordinary skill in the art will appreciate that other components may be included within computer system 100. For example, computer system 100 may include an antenna to enable the implementation of wireless applications.

According to one embodiment, CPU 102 includes a memory management unit (MMU) 103. MMU 103 manages physical memory resources for computer system 100. In one embodiment, MMU 103 implements a virtual memory system to create an illusion of a very large amount of memory that is exclusively available for each application run on computer system 102.

Figure 2:
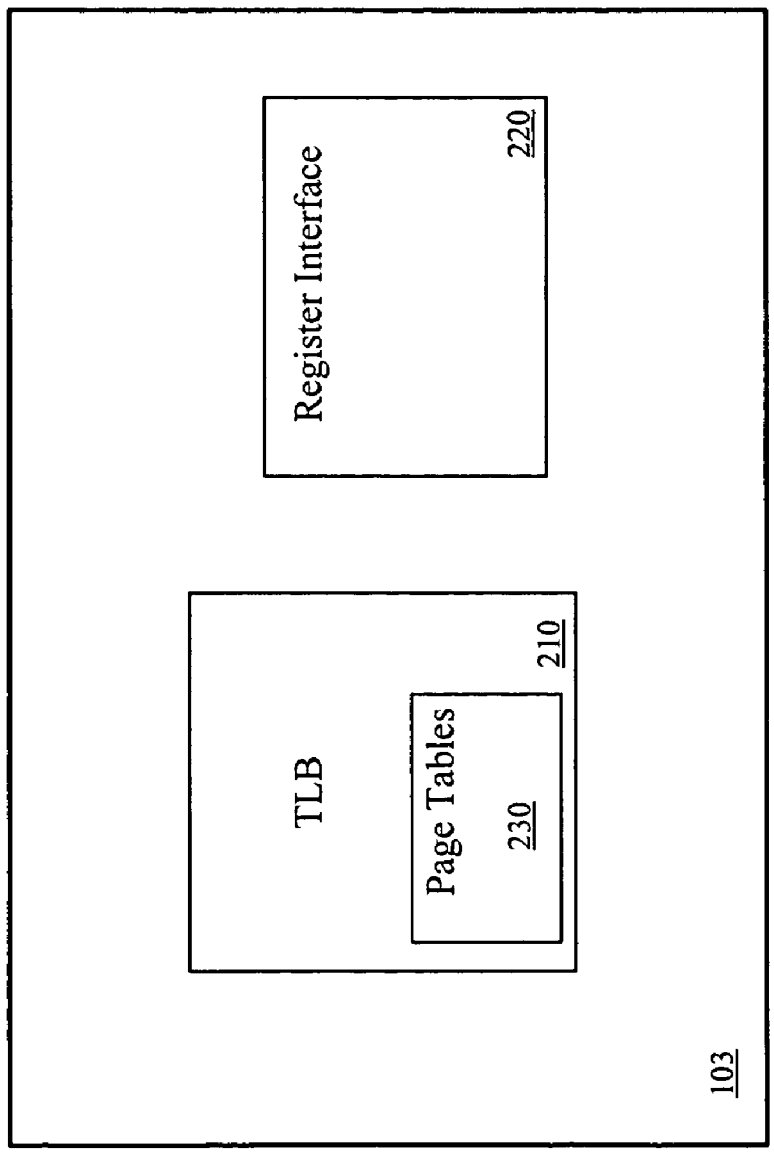
FIG. 2 illustrates one embodiment of a memory management unit.

FIG. 2 illustrates of one embodiment of MMU 103. MMU 103 includes TLB 210 and register interface 220. TLB 210 is a hardware cache that includes virtual address to physical address translations, and typically provides other information as well, such as the cacheability and access permissions of the addressed area. In one embodiment, TLB 210 includes copies of page table entries (PTEs) 230 from memory 115 that hardware or software heuristics have determined are most likely to be useful in the future.

In particular, TLB 210 includes the virtual to physical address translations for the current active addresses being used in memory 115. Consequently, it is not necessary to access PTEs in memory 115 each time an address translation is performed. Register interface 220 includes a multitude of registers that are used to control TLB 210. For instance, register interface 220 includes one or more registers that are used to choose which PTE 230 entry is to be read from or written to TLB 210.

Figure 3:
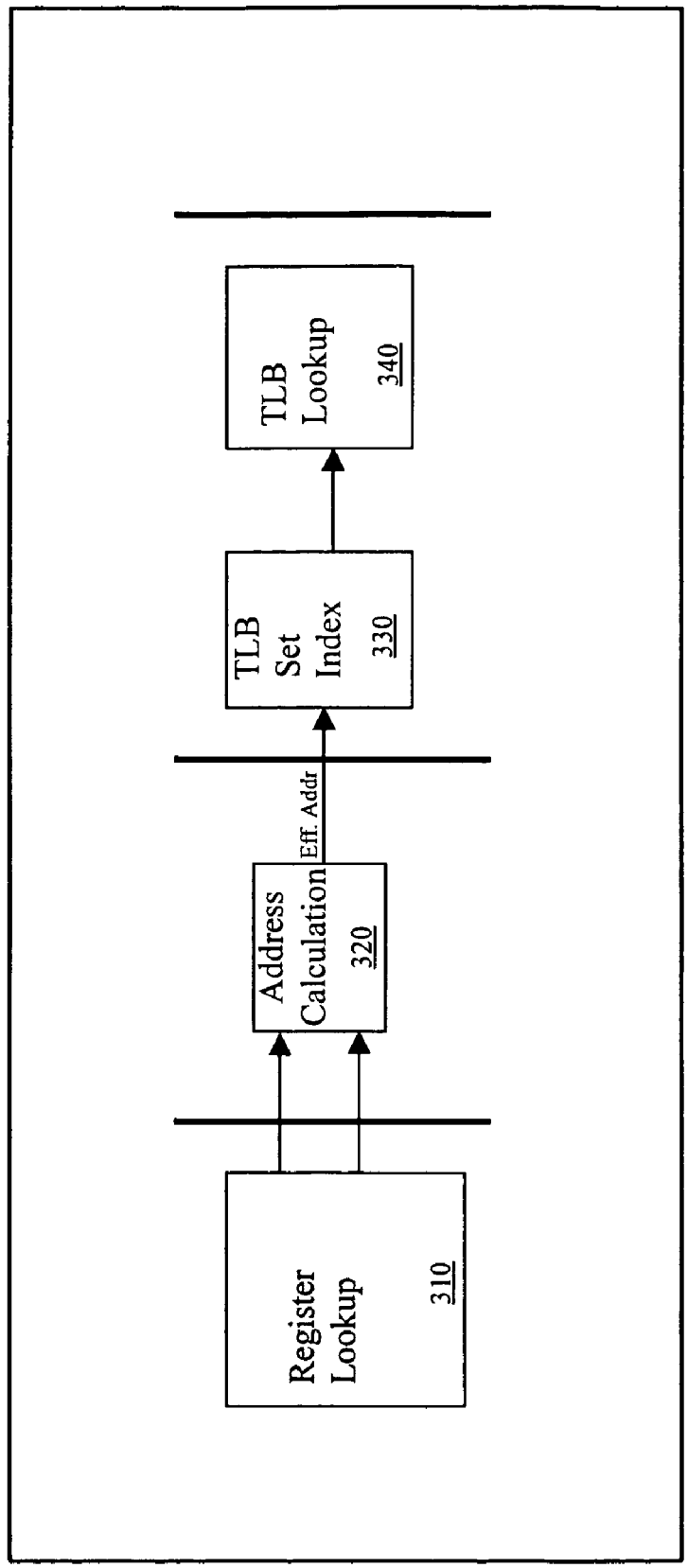
FIG. 3 illustrates one embodiment of a process pipeline for a translation lookaside buffer (TLB)

FIG. 3 illustrates one embodiment of a process pipeline for translating a virtual address to a physical address at TLB 210. At process block 310, a register lookup occurs at register interface 220. As discussed above, a PTE 230 entry is selected to be translated by TLB 210. At process block 320, address calculation occurs.

In one embodiment, the information obtained from the register lookup is used to calculate an effective address that is used to index TLB 210. In a further embodiment, the effective address includes an upper portion (e.g., upper 19 bits) of the virtual address (e.g., 32 bits) that is to be translated. At process block 330, the effective address is located within TLB 210 as determined by an index.

The effective address may be the address of an instruction that is being fetched for execution. Alternatively, the effective address may be the address of data being read or written by the processor. In one embodiment, the index is comprised of the lower bits (e.g., bits 13-16) of the effective address. At process block 340, a lookup of TLB 210 occurs in which the virtual address is associated with a corresponding physical address.

The problem with the above-described process is that the effective address must be generated before TLB 210 can be indexed. As discussed above, having to wait for an address to be generated results in longer translation times. According to one embodiment, information received from the register lookup is used to index TLB 210 prior to calculation of an effective address.

Figure 4:
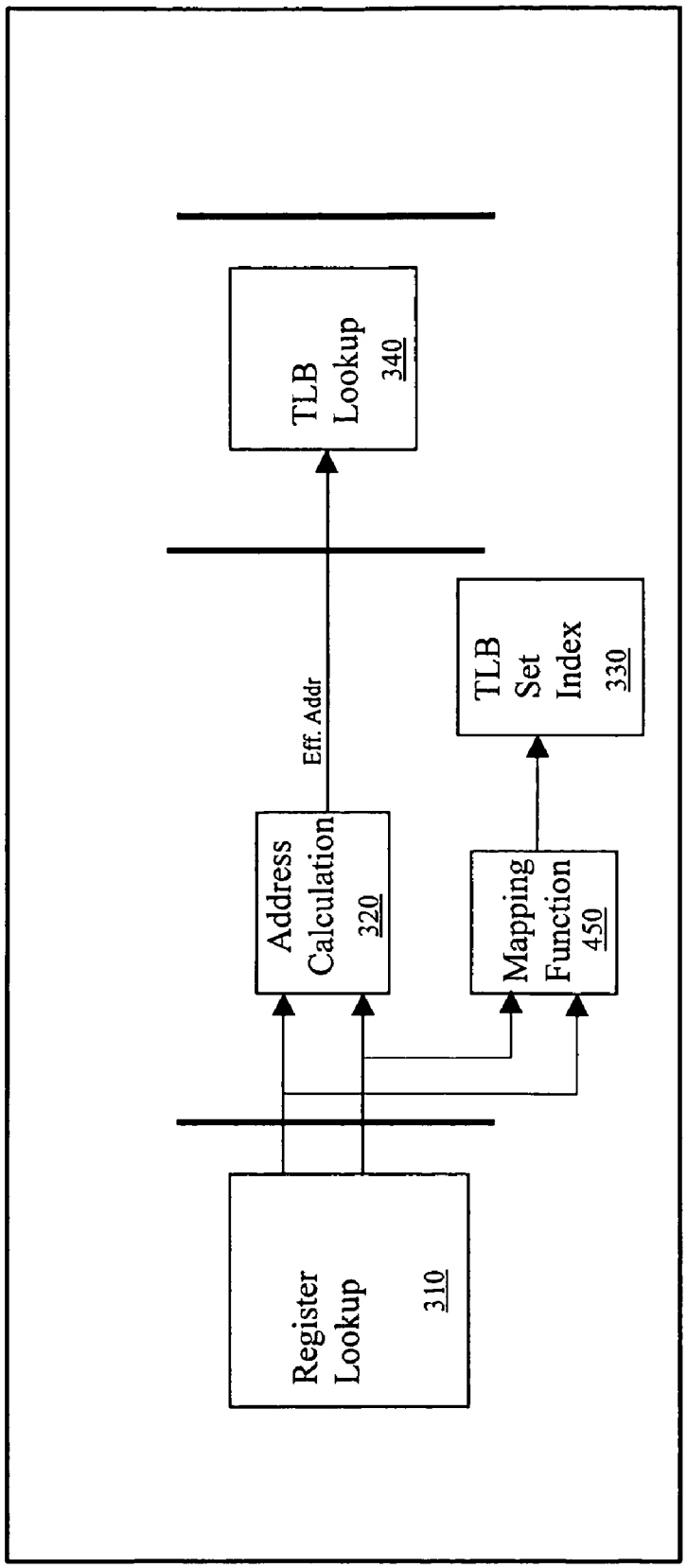
FIG. 4 illustrates another embodiment of a TLB process pipeline.

FIG. 4 illustrates another embodiment of a TLB 210 process pipeline. Similar to the process shown in FIG. 3, the register lookup 310, address calculation 310, index 330 and TLB lookup 340 process blocks are included. However, a mapping function 450 process block is also included.

Mapping function 450 uses information received from register lookup and predicts the TLB 210 index at process block 450. In one embodiment, the predicted index may not be the same index as provided by a conventional effective-address calculation. However, the prediction will typically yield the same index for the same input address.

TLB misses result in PTE's being filled into the predicted set, which may differ from the set implied by the calculated effective address. In the instances where an address was mapped to a different index than it did in a previous instruction, the new index does not require a back up computation. Consequently, the worst effect would be duplicate TLB 210 entries.

In this system, basic bits are still compared to determine a match, just as would occur if TLB 210 were fully associative. Further, mapping function 450 provides a relatively uniform output based on the input, so that TLB 210 entries are distributed throughout TLB 210 instead of bunched up in just a couple of entries. Note that in conventional a set-associative TLB, the bits used as the set index are not used in the compare that takes place in the TLB lookup 340 process.

According to one embodiment, mapping function 450 can be any function that operates quickly enough that the selection of the appropriate set within the TLB 210 entries can occur significantly more quickly than if the actual effective address was used to select the set. For example, mapping function 450 may be implemented using a N-bit add modulo $2^N$ of some base-register bits and some offset bits, where N is small. In another embodiment, mapping function 450 may be an Exclusive-OR of some base-register bits and some offset bits.

Figure 5:
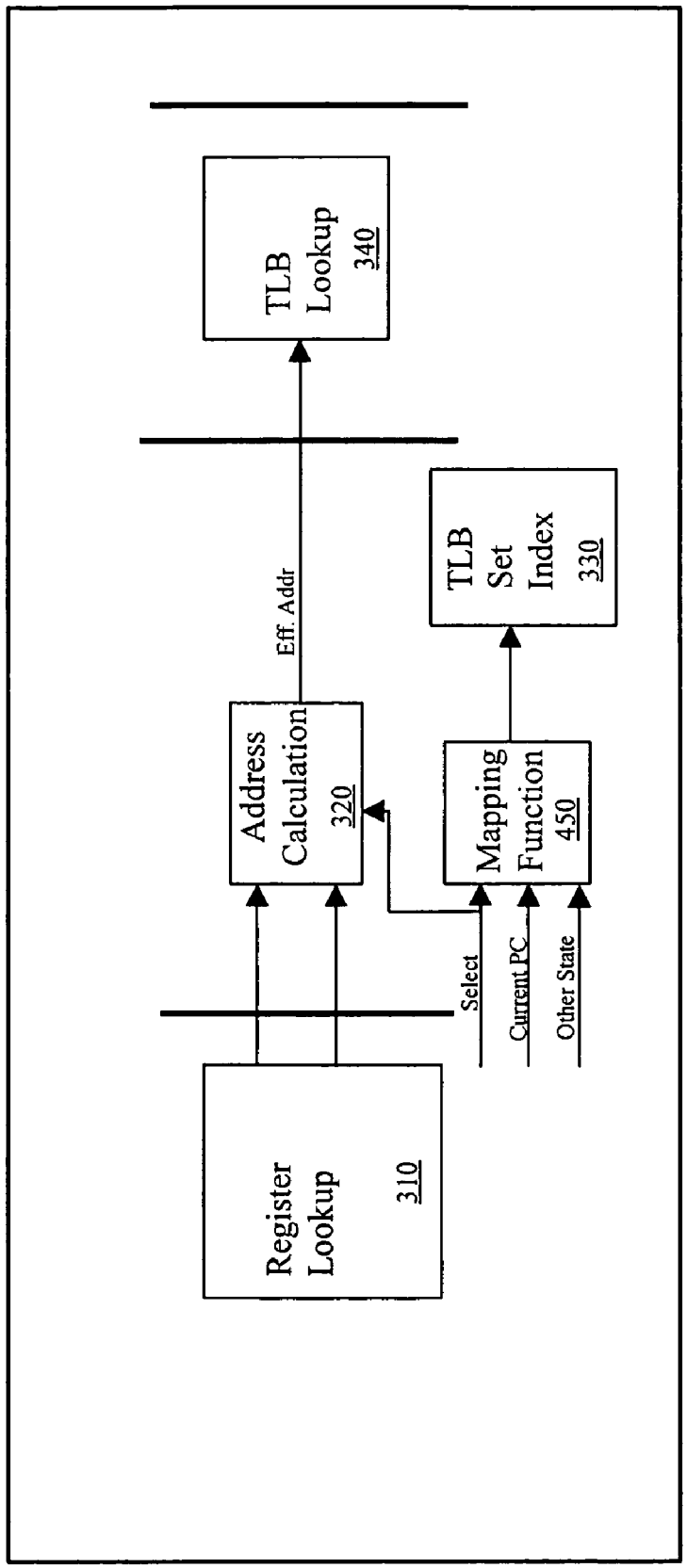
FIG. 5 illustrates yet another embodiment of a TLB process pipeline.

In yet another embodiment, signals from the pipeline not normally used in address calculation (such as a branch-taken indication) can be used by the mapping function to form the index. FIG. 5 illustrates another embodiment of a TLB process pipeline, where control signal are used to predict an effective address. In an instruction TLB 210 (e.g., a TLB that does translation for instruction addresses), mapping function 450 may use one or more bits from a current program counter PC with a signal indicating that a branch had occurred.

In response mapping function 450 combines the signals using a simple hash to predict which set to look up the translation for the address of the branch. This allows the set to be chosen when only the current program counter and the fact that a branch had occurred were known, which might be significantly before when the target address of the branch was available on the output of the address calculation. As discussed above, the TLB 210 set index might not be the same index as the selected address would provide.

The above-described prediction mechanism operates correctly, notwithstanding mis-predictions, such that no corrective action need be taken upon the occurrence of a misprediction. Further, the prediction mechanism conserves processing time in a TLB lookup stage, which is often a constricted area for timing. This enables more logic to operate on the output of the TLB in the same stage. Alternatively, the time savings enables the use of larger TLB arrays, or allows the process pipeline to be clocked at a higher speed (if the TLB is a speed path). In aggressively pipelined systems, it may allow a reduction in the pipeline length, which increases the performance per clock.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A memory management unit comprising:
   a translation lookaside buffer including a page table, wherein the page table includes M entries and M is an integer greater than zero; and
   a register interface configured to select one of the M entries,
   wherein the translation lookaside buffer is configured to calculate an effective address based on the selected one of the M entries while the translation lookaside buffer performs one of (i) maps the selected one of the M entries to an index and (ii) selects a set of the M entries based on a control signal, and
   wherein the effective address is used to index the M entries within the translation lookaside buffer.

2. The memory management unit of claim 1, wherein the effective address is calculated before the index is generated.

3. The memory management unit of claim 1, wherein the translation lookaside buffer is further configured to convert a virtual address to a physical address based on (i) the effective address and (ii) the index.

4. The memory management unit of claim 1, wherein the translation lookaside buffer is further configured to generate a physical address based on (i) the effective address and (ii) the index.

5. The memory management unit of claim 1, wherein the control signal includes a select signal, a program counter, or a state signal.

6. The memory management unit of claim 1, wherein the translation lookaside buffer selects the set of the M entries using a hash function to translate the effective address to a physical address.

7. The memory management unit of claim 1, wherein the effective address is a portion of a virtual address, and
   wherein the translation lookaside buffer converts the virtual address to a physical address by translating the effective address.

8. The memory management unit of claim 1, wherein the translation lookaside buffer is configured to one of (i) map the selected one of the M entries based on base-register bits and offset bits of a virtual address and (ii) select the set of the M entries based on the base-register bits and the offset bits of a virtual address.

9. The memory management unit of claim 1, wherein the translation lookaside buffer is configured to one of (i) map the selected one of the M entries and (ii) select the set of the M entries based on a N-bit add modulo $2^N$ function of base-register bits and offset bits of a virtual address, where N is an integer that is less than the number of bits in the virtual address.

10. The memory management unit of claim 1, wherein the translation lookaside buffer is configured to one of (i) map the selected one of the M entries based on an Exclusive-OR of base-register bits and offset bits of a virtual address and (ii) select the set of the M entries based on the Exclusive-OR of the base-register bits and the offset bits of the virtual address.

11. A method of operating a memory management unit, the method comprising:
    providing a translation lookaside buffer including a page table, wherein the page table includes M entries and M is an integer greater than zero;
    selecting one of the M entries; and
    calculating an effective address based on the selected one of the M entries while performing one of (i) mapping the selected one of the M entries to an index and (ii) selecting a set of the M entries based on a control signal,
    wherein the effective address is used to index the M entries within the translation lookaside buffer.

12. The method of claim 11, wherein the effective address is calculated before the index is generated.

13. The method of claim 11, further comprising converting a virtual address to a physical address based on (i) the effective address and (ii) the index.

14. The method of claim 11, further comprising generating a physical address based on (i) the effective address and (ii) the index.

15. The method of claim 11, wherein the control signal includes a select signal, a program counter, or a state signal.

16. The method of claim 11, further comprising selecting the set of the M entries using a hash function to translate the effective address to a physical address.

17. The method of claim 11, further comprising converting a virtual address to a physical address by translating the effective address,
    wherein the effective address is a portion of a virtual address.

18. The method of claim 11, wherein the mapping of the selected one of the M entries and the selecting of the set of the M entries are based on base-register bits and offset bits of a virtual address.

19. The method of claim 11, wherein the mapping of the selected one of the M entries and the selecting of the set of the M entries are based on a N-bit add modulo $2^N$ function of base-register bits and offset bits of a virtual address, where N is an integer that is less than the number of bits in the virtual address.

20. The method of claim 11, wherein the mapping of the selected one of the M entries and the selecting of the set of the M entries are based on an Exclusive-OR of base-register bits and offset bits of a virtual address.

* * * * *